(12) United States Patent
Sun et al.

(10) Patent No.: US 11,492,436 B2
(45) Date of Patent: Nov. 8, 2022

(54) MODIFIED POLYVINYL ALCOHOL-BASED POLYMER AND ITS APPLICATION

(71) Applicant: CHANG CHUN PETROCHEMICAL CO., LTD., Taipei (TW)

(72) Inventors: Jyun-Ru Sun, Taipei (TW);
Huan-Ming Chang, Taipei (TW);
Cheng-Fan Wang, Taipei (TW);
Chia-Hao Hsu, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/582,202

(22) Filed: Jan. 24, 2022

(65) Prior Publication Data
US 2022/0251273 A1  Aug. 11, 2022

Related U.S. Application Data

(60) Provisional application No. 63/145,486, filed on Feb. 4, 2021.

(51) Int. Cl.
*C08F 261/04* (2006.01)
*C08F 16/06* (2006.01)

(52) U.S. Cl.
CPC ............ *C08F 261/04* (2013.01); *C08F 16/06* (2013.01); *C08F 2810/30* (2013.01)

(58) Field of Classification Search
CPC .... C08F 2810/30; C08F 16/06; C08F 116/06; C08F 216/06; C08F 261/04
See application file for complete search history.

(56) References Cited

U.S. PATENT DOCUMENTS 4,665,123 A * 5/1987 Goldenberg ........... G02B 1/043
525/61

FOREIGN PATENT DOCUMENTS

CN  105031706 A  * 11/2015

OTHER PUBLICATIONS

Otte, D. et al., "13C NMR Spectroscopy for the Quantitative Determination of Compound Ratios and Polymer End Groups," Organic Letters, vol. 16, Mar. 6, 2014, American Chemical Society, pp. 1566-1569.

* cited by examiner

*Primary Examiner* — Mark S Kaucher
(74) *Attorney, Agent, or Firm* — Withrow & Terranova, P.L.L.C.; Vincent K. Gustafson

(57) ABSTRACT

The present disclosure provides a modified polyvinyl alcohol-based polymer, which comprises a modifying monomer unit represented by Formula

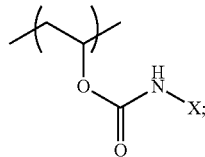

Formula (I)

wherein, X is a moiety comprising an alkenyl group, and the modified polyvinyl alcohol-based polymer has a saponification degree of 67 mol % to 78 mol % and a modification rate of 0.02 mol % to 1.5 mol %. The modified polyvinyl alcohol-based polymer is suitable to be used as a dispersant for suspension polymerization, to make the obtained polyvinyl chloride-based resin have reduced particle diameter and few coarse particles.

13 Claims, No Drawings

MODIFIED POLYVINYL ALCOHOL-BASED POLYMER AND ITS APPLICATION

CROSS-REFERENCE TO RELATED APPLICATION

Pursuant to 35 U.S.C. § 119(e), this application claims the benefit of the priority to U.S. Provisional Patent Application No. 63/145,486, filed on Feb. 4, 2021. The content of the prior application is incorporated herein by its entirety.

BACKGROUND OF THE INVENTION

1. Field of the Invention

The present disclosure relates to a modified polyvinyl alcohol-based polymer (modified PVA-based polymer). In addition, the present disclosure also relates to an application of the modified polyvinyl alcohol-based polymer for suspension polymerization reaction.

2. Description of the Prior Arts

Polyvinyl chloride-based resin (PVC-based resin) is a resin material broadly used nowadays, which can be produced by suspension polymerization, emulsion polymerization, bulk polymerization, or solution polymerization.

Emulsion polymerization produces PVC-based resins having poor thermal stability and electric insulativity, which are hardly adopted in the industry. Bulk polymerization has difficulties in stirring during polymerization and heat conduction, resulting in higher production cost. In addition, solution polymerization produces PVC-based resins having lower polymerization degree and results in environmental contamination because of toxic solvents involved in the producing process, so this method is also not widely adopted in the industry. Currently, suspension polymerization is used to produce most PVC-based resins. In this method, free radical polymerization is conducted with vinyl chloride monomer (VCM) in droplets suspended in an aqueous solution dissolving an initiator, to produce a PVC-based resin.

However, stirring and a dispersant are required to keep the suspension polymerization stable. Thus, a dispersant is necessary for suspension polymerization in production of PVC-based resins. It is expected that the dispersant can reduce the instability of suspension polymerization.

It has been known that polyvinyl alcohol-based polymer can be used as a dispersant for suspension polymerization. However, the stabilization effect brought by the conventional polyvinyl alcohol-based polymers in suspension polymerization reaction is limited, and the resulting PVC-based resin has a larger particle diameter and many coarse particles, which still needs to be improved.

SUMMARY OF THE INVENTION

One purpose of the present disclosure is to improve the conventional polyvinyl alcohol-based polymer, to make a polyvinyl alcohol-based polymer suitable to be used as a dispersant for suspension polymerization, and advantageous for producing a polyvinyl chloride-based resin having reduced particle diameter and few coarse particles.

To achieve the above purpose, the present disclosure provides a modified polyvinyl alcohol-based polymer, and the modified polyvinyl alcohol-based polymer comprises a modifying monomer unit represented by Formula (I):

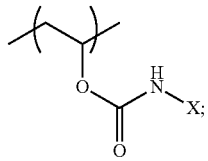

Formula (I)

in Formula (I), X is a moiety comprising an alkenyl group;

wherein, the modified polyvinyl alcohol-based polymer has a saponification degree of 67 percent by mole (mol %) to 78 mol %, and the modified polyvinyl alcohol-based polymer has a modification rate of 0.02 mol % to 1.5 mol %.

The modified polyvinyl alcohol-based polymer is an isocyanate-modified polyvinyl alcohol-based polymer (isocyanate-modified PVA-based polymer). As shown in the above Formula (I), the modifying monomer unit of the modified polyvinyl alcohol-based polymer has a side-chain structure which can graft a moiety comprising an alkenyl group (X) to PVA through a urethane group. In the present disclosure, introduction of the side-chain structure promotes the grafting of the modified polyvinyl alcohol-based polymer to the vinyl chloride monomer, increases the protection of colloid and enhances the dispersion stability of suspension polymerization, and these are advantageous for controlling the particle diameter and particle distribution of the polyvinyl chloride-based resin.

Since the modified polyvinyl alcohol-based polymer has a modifying monomer unit represented by Formula (I), a saponification degree of 67 mol % to 78 mol % and a modification rate of 0.02 mol % to 1.5 mol %, the modified polyvinyl alcohol-based polymer of the present disclosure can be used as a dispersant for suspension polymerization, provide great dispersion stability in suspension polymerization reaction, and make the obtained polyvinyl chloride-based resin have advantages of reduced particle diameter and few coarse particles.

The number of hydroxyl in the modified polyvinyl alcohol-based polymer affects the hydrophilicity of modified polyvinyl alcohol-based polymer, thereby affecting the physical properties of polyvinyl chloride-based resin. In one embodiment, the modified polyvinyl alcohol-based polymer may have a saponification degree of 68 mol % to 76 mol %. In another embodiment, the modified polyvinyl alcohol-based polymer may have a saponification degree of 68 mol % to 74 mol %. In yet another embodiment, the modified polyvinyl alcohol-based polymer may have a saponification degree of 70 mol % to 73 mol %.

In one embodiment, the modified polyvinyl alcohol-based polymer may have a modification rate of 0.03 mol % to 1.4 mol %. In another embodiment, the modified polyvinyl alcohol-based polymer may have a modification rate of 0.04 mol % to 1.3 mol %. In yet another embodiment, the modified polyvinyl alcohol-based polymer may have a modification rate of 0.04 mol % to 1.28 mol %. In some embodiments, the modified polyvinyl alcohol-based polymer may have a modification rate of 0.04 mol % to 1.00 mol % or 0.04 mol % to 0.50 mol %. The modification rate can be determined by quantitative analysis of hydrogen-1 nuclear magnetic resonance (NMR) spectroscopy or carbon-13 NMR spectroscopy. In the case of carbon-13 NMR spectroscopy, the quantitative analysis can be conducted by using inverse-gated decoupling pulse sequence. See D. A. L.

Otte, D. E. Borchmann, C. Lin, M. Weck, K. A. Woerpel, *Organic Letters* 2014 16 (6), 1566-1569.

In Formula (I), X may be a moiety having a carbon number of 2 to 59 and comprising at least one alkenyl group. In other embodiments, X may be a moiety having a carbon number of 2 to 44 and comprising at least one alkenyl group, a moiety having a carbon number of 2 to 22 and comprising at least one alkenyl group, a moiety having a carbon number of 2 to 18 and comprising at least one alkenyl group, or a moiety having a carbon number of 2 to 12 and comprising at least one alkenyl group.

According to the present disclosure, the alkenyl group comprised in X may be a mono-olefin group or a polyenyl group, the polyenyl group may be, such as, a dienyl group or a trienyl group, but is not limited thereto. Based on the position of carbon-carbon double bond, the alkenyl group comprised in X can be categorized into a terminal alkenyl group or an internal alkenyl group (also known as non-terminal alkenyl group). The skilled artisan can understand that, the term "terminal alkenyl group" refers to the alkenyl group in which the carbon-carbon double bond is located at the terminal position of the carbon chain of X; and the term "internal alkenyl group" refers to the alkenyl group in which the carbon-carbon double bond is not located at the terminal position of the carbon chain of X. Additionally, based on the relative positions of multiple carbon-carbon double bonds, the alkenyl group comprised in X also can be categorized into a conjugated polyenyl group, an isolated polyenyl group or a cumulenyl group. The skilled artisan can understand that, the term "conjugated polyenyl group" refers to the alkenyl group in which two carbon-carbon double bonds are separated by one carbon-carbon single bond; the term "isolated polyenyl group" refers to the alkenyl group in which two carbon-carbon double bonds are separated by two or more carbon-carbon single bonds; and the term "cumulenyl group" refers to the alkenyl group having two or more adjacent carbon-carbon double bonds.

In one embodiment, the modifying monomer unit has a structure represented by Formula (I-I):

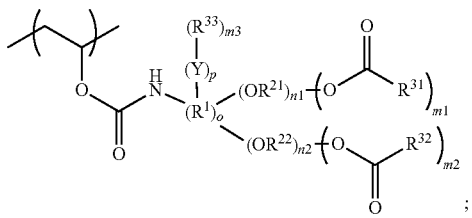

Formula (I-I)

in Formula (I-I), Y is —C(=O)—, —P(=O)($R^{41}$)—, —P(=S)($R^{42}$)—, —O—, —S—, or a phenylene group;

in Formula (I-I), $R^1$ is a C1 to C10 alkylene group; $R^{21}$ and $R^{22}$ independently represent a C1 to C10 alkylene group; $R^{31}$, $R^{32}$ and $R^{33}$ each independently represent a C2 to C6 alkenyl group substituted by none of halo group and aldehyde group, a C2 to C6 alkenyl group substituted by a halo group, or a C2 to C6 alkenyl group substituted by an aldehyde group; $R^{41}$ and $R^{42}$ each independently represent a C1 to C6 alkyl group;

in Formula (I-I), o, p, n1, n2, m1, m2 and m3 each independently represent 0 or 1; the sum of m1, m2 and m3 is 1 to 3; n1 is not larger than m1; n2 is not larger than m2; p is not larger than m3.

In Formula (I-I), at least one of m1, m2 and m3 is 1. In one embodiment, when m1 is 1, n1 is 0 or 1. In another embodiment, when m2 is 1, n2 is 0 or 1. In yet another embodiment, when m3 is 1, p is 0 or 1. In Formula (I-I), when m1 is 0, n1 is 0; when m2 is 0, n2 is 0; when m3 is 0, p is 0; provided that m1, m2 and m3 are not 0 at the same time.

In Formula (I-I), when one of m1, m2 and m3 is 1, and the other two are 0, o is 0 or 1, and the C1 to C10 alkylene group represented by $R^1$ may be a bivalent straight C1 to C10 alkylene group or a bivalent branched C2 to C10 alkylene group. In Formula (I-I), when two of m1, m2 and m3 are 1, and the other one is 0, o is 1, and the C1 to C10 alkylene group represented by $R^1$ may be a trivalent C1 to C10 alkylene group. In Formula (I-I), when all of m1, m2 and m3 are 1, o is 1, and the C1 to C10 alkylene group represented by $R^1$ may be a tetravalent C1 to C10 alkylene group.

In Formula (I-I), the C1 to C10 alkylene group represented by $R^{21}$, $R^{22}$ may be a bivalent straight C1 to C10 alkylene group or a bivalent branched C2 to C10 alkylene group. Preferably, the C1 to C10 alkylene group represented by $R^{21}$, $R^{22}$ may be a bivalent straight C1 to C10 alkylene group.

In Formula (I-I), the C2 to C6 alkenyl group substituted by none of halo group and aldehyde group represented by $R^{31}$, $R^{32}$, $R^{33}$ may be a C2 to C6 mono-olefin group substituted by none of halo group and aldehyde group, a C3 to C6 dienyl group substituted by none of halo group and aldehyde group, or a C4 to C6 trienyl group substituted by none of halo group and aldehyde group, but is not limited thereto. In Formula (I-I), the C2 to C6 alkenyl group substituted by a halo group represented by $R^{31}$, $R^{32}$, $R^{33}$ may be a C2 to C6 mono-olefin group substituted by a halo group, a C3 to C6 dienyl group substituted by a halo group, or a C4 to C6 trienyl group substituted by a halo group, but is not limited thereto. In Formula (I-I), the C2 to C6 alkenyl group substituted by an aldehyde group represented by $R^{31}$, $R^{32}$, $R^{33}$ may be a C2 to C6 mono-olefin group substituted by an aldehyde group, a C3 to C6 dienyl group substituted by an aldehyde group, or a C4 to C6 trienyl group substituted by an aldehyde group, but is not limited thereto.

In Formula (I-I), the C1 to C6 alkyl group independently represented by $R^{41}$, $R^{42}$ may be a non-substituted straight C1 to C6 alkyl group or a non-substituted branched C3 to C6 alkyl group.

In another embodiment, the modifying monomer unit has a structure represented by Formula (I-II):

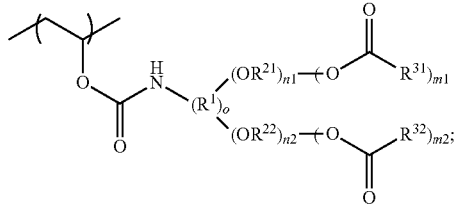

Formula (I-II)

in Formula (I-II), $R^1$ is a C1 to C6 alkylene group, $R^{21}$ and $R^{22}$ each independently represent a C1 to C6 alkylene group, and $R^{31}$ and $R^{32}$ each independently represent a C2 to C6 mono-olefin group substituted by none of halo group and aldehyde group;

in Formula (I-II), o and m1 are 1; n1, n2 and m2 each independently represent 0 or 1; and n2 is not larger than m2.

In Formula (I-II), at least one of m1 and m2 is 1. In one embodiment, when m1 is 1, n1 is 0 or 1. In another embodiment, when m2 is 1, n2 is 0 or 1. In Formula (I-II), when m1 is 0, n1 is 0; when m2 is 0, n2 is 0, provided that m1 and m2 are not 0 at the same time.

In Formula (I-II), when o and m1 are 1, and m2 and n2 are 0, the C1 to C10 alkylene group represented by $R^1$ may be a bivalent straight C1 to C10 alkylene group or a bivalent branched C2 to C10 alkylene group; when all of o, m1 and m2 are 1, n1 and n2 may each independently represent 0 or 1, and the C1 to C10 alkylene group represented by $R^1$ may be a trivalent C1 to C10 alkylene group.

In Formula (I-II), the C1 to C10 alkylene group represented by $R^{21}$, $R^{22}$ may be a bivalent straight C1 to C10 alkylene group or a bivalent branched C2 to C10 alkylene group. Preferably, the C1 to C10 alkylene group represented by $R^{21}$, $R^{22}$ may be a bivalent straight C1 to C10 alkylene group.

In Formula (I-II), the C2 to C6 alkenyl group substituted by none of halo group and aldehyde group represented by $R^{31}$, $R^{32}$ may be a C2 to C6 mono-olefin group substituted by none of halo group and aldehyde group, a C3 to C6 dienyl group substituted by none of halo group and aldehyde group, or a C4 to C6 trienyl group substituted by none of halo group and aldehyde group, but is not limited thereto; the C2 to C6 alkenyl group substituted by a halo group represented by $R^{31}$, $R^{32}$ may be a C2 to C6 mono-olefin group substituted by a halo group, a C3 to C6 dienyl group substituted by a halo group, or a C4 to C6 trienyl group substituted by a halo group, but is not limited thereto; the C2 to C6 alkenyl group substituted by an aldehyde group represented by $R^{31}$, $R^{32}$ may be a C2 to C6 mono-olefin group substituted by an aldehyde group, a C3 to C6 dienyl group substituted by an aldehyde group, or a C4 to C6 trienyl group substituted by an aldehyde group, but is not limited thereto. Preferably, $R^{31}$ and $R^{32}$ each independently represent a C2 to C6 mono-olefin group substituted by none of halo group and aldehyde group.

In yet another embodiment, the modifying monomer unit has a structure represented by Formula (I-III):

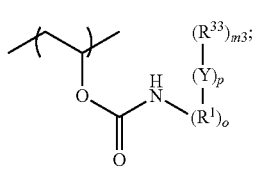

Formula (I-III)

in Formula (I-III), $R^1$ is a C1 to C6 alkylene group, Y is —C(=O)—, —P(=O)($R^{41}$)—, —P(=S)($R^{42}$)—, —O—, —S—, or a phenylene group; $R^{33}$ is a C2 to C6 mono-olefin group substituted by none of halo group and aldehyde group, a C2 to C6 mono-olefin group substituted by a halo group, a C2 to C6 mono-olefin group substituted by an aldehyde group, a C3 to C6 dienyl group substituted by none of halo group and aldehyde group, a C3 to C6 dienyl group substituted by a halo group, a C3 to C6 dienyl group substituted by an aldehyde group, a C4 to C6 trienyl group substituted by none of halo group and aldehyde group, a C4 to C6 trienyl group substituted by a halo group, or a C4 to C6 trienyl group substituted by an aldehyde group;

in Formula (I-III), o and p each independently represent 0 or 1, and m3 is 1.

In Formula (I-III), when o is 1, the C1 to C10 alkylene group represented by $R^1$ may be a bivalent straight C1 to C10 alkylene group or a bivalent branched C2 to C10 alkylene group.

The alkenyl group, the C2 to C6 alkenyl group substituted by none of halo group and aldehyde group, the mono-olefin group, or the C2 to C6 mono-olefin group substituted by none of halo group and aldehyde group may be a terminal alkenyl group, such as, —CH=$CH_2$, —$CH_2$CH=$CH_2$, —C($CH_3$)=$CH_2$, —$CH_2CH_2$CH=$CH_2$, —CH($CH_3$)CH=$CH_2$, —$CH_2$C($CH_3$)=$CH_2$, —C($CH_2CH_3$)=$CH_2$, —$CH_2CH_2CH_2$CH=$CH_2$, —CH($CH_3$)$CH_2$CH=$CH_2$, —$CH_2$CH($CH_3$)CH=$CH_2$, —$CH_2CH_2$C($CH_3$)=$CH_2$, —$CH_2CH_2CH_2CH_2$CH=$CH_2$, —CH($CH_3$)$CH_2CH_2$CH=$CH_2$, —C($CH_3$)$_2CH_2$CH=$CH_2$, —$CH_2$C($CH_3$)$_2$CH=$CH_2$, —$CH_2$CH($CH_3$)C($CH_3$)=$CH_2$, but is not limited thereto. In addition, the alkenyl group, the C2 to C6 alkenyl group substituted by none of halo group and aldehyde group, the mono-olefin group, or the C2 to C6 mono-olefin group substituted by none of halo group and aldehyde group also may be an internal alkenyl group, such as, —CH=CH($CH_3$), —CH=CH$CH_2CH_3$, —$CH_2$CH=CH$CH_3$, —C($CH_3$)=CH$CH_3$, —CH=C($CH_3$)$_2$, —CH=CH$CH_2CH_2CH_3$, —$CH_2$CH=CH$CH_2CH_3$, —$CH_2CH_2$CH=CH$CH_3$, —C($CH_3$)=CH$CH_2CH_3$, —CH=C($CH_3$)$CH_2CH_3$, —CH=CHCH($CH_3$)$_2$, —CH($CH_3$)CH=CH$CH_3$, —$CH_2$C($CH_3$)=CH$CH_3$, —$CH_2$CH=C($CH_3$)$_2$, —CH=CH$CH_2CH_2CH_2CH_3$, —$CH_2$CH=CH$CH_2CH_2CH_3$, —$CH_2CH_2$CH=CH$CH_2CH_3$, —$CH_2CH_2CH_2$CH=CH$CH_3$, —C($CH_3$)=CH$CH_2CH_2CH_3$, —CH=C($CH_3$)$CH_2CH_2CH_3$, —C($CH_3$)=C($CH_3$)$CH_2CH_3$, —CH=CHC($CH_3$)$_3$, —CH($CH_3$)CH=CH$CH_2CH_3$, —$CH_2$C($CH_3$)=CH$CH_2CH_3$, —$CH_2$CH=C($CH_3$)$CH_2CH_3$, —$CH_2$CH=CHCH($CH_3$)$_2$, —C($CH_3$)$_2$CH=CH$CH_3$, but is not limited thereto. Preferably, the alkenyl group, the C2 to C6 alkenyl group substituted by none of halo group and aldehyde group, the mono-olefin group, or the C2 to C6 mono-olefin group substituted by none of halo group and aldehyde group is —CH=$CH_2$, —$CH_2$CH=$CH_2$, —C($CH_3$)=$CH_2$, —$CH_2CH_2$CH=$CH_2$, —CH($CH_3$)CH=$CH_2$, —$CH_2$C($CH_3$)=$CH_2$, —C($CH_2CH_3$)=$CH_2$, —$CH_2CH_2CH_2$CH=$CH_2$, —$CH_2CH_2$C($CH_3$)=$CH_2$, —CH=CH($CH_3$), —CH=CH$CH_2CH_3$, —$CH_2$CH=CH$CH_3$, —CH=C($CH_3$)$_2$, —CH=CHCH($CH_3$)$_2$, —$CH_2$CH=C($CH_3$)$_2$, —CH=CH$CH_2CH_2CH_3$.

The alkenyl group, the mono-olefin group, or the C2 to C6 mono-olefin group substituted by a halo group may be, such as, —C($X^1$)=$CH_2$, —CH=CH($X^1$), —$CH_2$=C($X^1$)($CH_3$), —$CH_2$CH=CH($X^1$), —C($CH_3$)=CH($X^1$), —C($X^1$)=CH$CH_2CH_3$, —$CH_2$C($X^1$)=CH$CH_3$, —$CH_2$CH=C($X^1$)$CH_3$, —$CH_2CH_2$CH=CH($X^1$), —C($CH_3$)=C($X^1$)$CH_3$, —C($X^1$)=C($CH_3$)$_2$, —C($X^1$)=C($CH_3$)$_2$, —CH($CH_3$)C($X^1$)=$CH_2$, —CH($CH_3$)CH=CH($X^1$), —$CH_2$C($CH_3$)=CH($X^1$), —C($X^1$)=CH$CH_2CH_2CH_3$, —CH=C($X^1$)$CH_2CH_2CH_3$, —$CH_2$C($X^1$)=CH$CH_2CH_3$, —$CH_2$CH=C($X^1$)$CH_2CH_3$, —$CH_2CH_2$C($X^1$)=CH$CH_3$, —$CH_2CH_2$CH=C($X^1$)$CH_3$, —$CH_2CH_2CH_2$CH=C($X^1$)$CH_3$, —$CH_2CH_2CH_2$C($X^1$)=$CH_2$, —C($CH_3$)=C($X^1$)$CH_2CH_3$, —C($X^1$)=C($CH_3$)$CH_2CH_3$, —CH=C($X^1$)CH($CH_3$)$CH_3$, —CH($CH_3$)$CH_2$C($X^1$)=$CH_2$, —CH($CH_3$)$CH_2$CH=CH ($X^1$), —C($CH_3$)$_2$C($X^1$)=$CH_2$, —C($CH_3$)$_2$CH=CH($X^1$), —C($X^1$)=CH$CH_2CH_2CH_2CH_3$, —CH=C($X^1$)$CH_2CH_2CH_2CH_3$, —$CH_2CH_2CH_2$C($X^1$)=$CH_2$, —$CH_2CH_2CH_2CH_2$CH=CH($X^1$), —C($CH_3$)=C($X^1$)

$CH_2CH_2CH_3$, $—C(X^1)=C(CH_3)CH_2CH_2CH_3$, $—C(X^1)=CHC(CH_3)_3$, $—CH=C(X^1)C(CH_3)_3$, $—C(CH_3)_2CH_2C(X^1)=CH_2$, $—C(CH_3)_2CH_2CH=CH(X^1)$, $—CH_2C(CH_3)_2C(X^1)=CH_2$, $—CH_2C(CH_3)_2CH=CH(X^1)$, $—CH_2CH(CH_3)C(CH_3)=CH(X^1)$, but is not limited thereto. Herein, $X^1$ may be chloro, bromo or iodo. Preferably, the alkenyl group, the mono-olefin group, or the C2 to C6 mono-olefin group substituted by a halo group is $—C(Cl)=CH_2$, $—CH=CH(Cl)$, or $—CH_2CH=CH(Cl)$.

The alkenyl group, the mono-olefin group, or the C2 to C6 mono-olefin group substituted by an aldehyde group may be, such as, $—CH=CHCHO$, $—CH_2CH=CHCHO$, $—CH_2CH_2CH=CHCHO$, $—CH(CH_3)CH=CHCHO$, $—CH_2C(CH_3)=CHCHO$, $—CH_2CH_2CH_2CH=CHCHO$, but is not limited thereto. Preferably, the alkenyl group, the mono-olefin group, or the C2 to C6 mono-olefin group substituted by an aldehyde group is $—CH=CHCHO$.

The alkenyl group, the polyenyl group, the dienyl group, or the C3 to C6 dienyl group substituted by none of halo group and aldehyde group may be a conjugated dienyl group, such as, $—CH=CH—CH=CH_2$, $—CH_2—CH=CH—CH=CH_2$, $—CH=CH—CH=CH_2—CH_3$, $—CH_2—CH_2—CH=CH—CH=CH_2$, $—CH=CH—CH=CH—CH_2CH_3$, $—CH_2—CH=CH—CH=CH—CH_3$, but is not limited thereto. In addition, the alkenyl group, the polyenyl group, the dienyl group, the C3 to C6 dienyl group substituted by none of halo group and aldehyde group also may be an isolated dienyl group, such as, $—CH=CH—CH_2—CH=CH_2$, $—CH=CH—CH(CH_3)—CH=CH_2$, $—CH=CH—CH_2—CH_2—CH=CH_2$, but is not limited thereto. Moreover, the alkenyl group, the polyenyl group, the dienyl group, and the C3 to C6 dienyl group substituted by none of halo group and aldehyde group also may be an allenyl group, such as, $—CH=C=CH_2$, $—C(CH_3)=C=CH_2$, $—CH_2CH=C=CH_2$, $—CH_2CH_2CH=C=CH_2$, but is not limited thereto. Preferably, the alkenyl group, the polyenyl group, the dienyl group, and the C3 to C6 dienyl group substituted by none of halo group and aldehyde group is $—CH=CH—CH=CH_2$, $—C(CH_3)=C=CH_2$.

The alkenyl group, the polyenyl group, the dienyl group, or the C3 to C6 dienyl group substituted by a halo group may be, such as, $—C(X^1)=CH—CH=CH_2$, $—CH_2C(X^1)=CH—CH=CH_2$, $—C(X^1)=CH—CH=CH—CH_3$, $—CH_2CH=CH—CH=CH(X^1)$, $—CH=CH—CH=C(X^1)—CH_3$, $—CH_2CH_2CH=CH—CH=CH(X^1)$, $—CH=CH—CH=CH(X^1)$, $—C(X^1)=CH—CH=CHCH_2CH_3$, $—CH_2CH=CH—CH=CHCH_3$, $—C(X^1)=CHCH_2CH=CH_2$, $—CH=CHCH_2CH=CH(X^1)$, $—C(X^1)=CHCH_2CH=CH(X^1)$, $—C(X^1)=CHCH(CH_3)CH=CH_2$, $—C(X^1)=CHCH_2CH_2CH=CH_2$, but is not limited thereto. Herein, $X^1$ may be chloro, bromo or iodo.

The alkenyl group, the polyenyl group, the dienyl group, or the C3 to C6 dienyl group substituted by an aldehyde group may be, such as, $—CH=CH—CH=CHCHO$, $—CH_2CH=CH—CH=CHCHO$, $—CH_2CH_2CH=CH—CH=CHCHO$, $—CH=CHCH_2CH=CHCHO$, $—CH=CHCH_2CH_2CH=CHCHO$, but is not limited thereto.

The alkenyl group, the polyenyl group, the trienyl group, or the C4 to C6 trienyl group substituted by none of halo group and aldehyde group may be a conjugated trienyl group, such as, $—CH=CH—CH=CH—CH=CH_2$. The alkenyl group, the polyenyl group, the trienyl group, or the C4 to C6 trienyl group substituted by a halo group may be, such as, $—C(X^1)=CH—CH=CH—CH=CH_2$, $—CH=C(X^1)—CH=CH—CH=CH_2$, $—CH=CH—C(X^1)=CH—CH=CH_2$, $—CH=CH—CH=CH—CH=CH(X^1)$, but is not limited thereto. Herein, $X^1$ may be chloro, bromo or iodo. The C4 to C6 trienyl group substituted by an aldehyde group may be, such as, $—CH=CH—CH=CH—CH=CHCHO$, but is not limited thereto.

The C1 to C10 alkylene group may be a bivalent straight C1 to C10 alkylene group, such as, $—CH_2—$, $—CH_2CH_2—$, $—CH_2CH_2CH_2—$, $—CH_2CH_2CH_2CH_2—$, $—CH_2CH_2CH_2CH_2CH_2—$, but is not limited thereto. Alternatively, the C1 to C10 alkylene group also may be a bivalent branched C2 to C10 alkylene group, such as, $—CH(CH_3)—$, $—C(CH_3)_2—$, $—CH(CH_3)CH_2—$, $—CH_2CH(CH_3)CH_2—$, but is not limited thereto. In addition, the C1 to C10 alkylene group also may be a trivalent C1 to C10 alkylene group, such as,

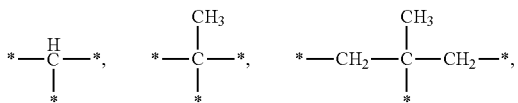

but is not limited thereto. Moreover, the C1 to C10 alkylene group also may be a tetravalent C1 to C10 alkylene group, such as,

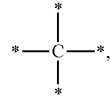

but is not limited thereto. Preferably, the C1 to C10 alkylene group represented by $R^1$ may be $—CH_2—$, $—CH_2CH_2—$, $—C(CH_3)_2—$,

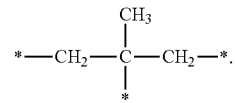

The C1 to C6 alkyl group or the non-substituted straight C1 to C6 alkyl group may be, such as, $—CH_3$, $—CH_2CH_3$, $—CH_2CH_2CH_3$, $—CH_2CH_2CH_2CH_3$, $—CH_2CH_2CH_2CH_2CH_3$, $—CH_2CH_2CH_2CH_2CH_2CH_3$, but is not limited thereto. Alternatively, the C1 to C6 alkyl group or the non-substituted C3 to C6 branched alkyl group may be, such as, $—CH(CH_3)_2$, $—CH_2CH(CH_3)_2$, $—C(CH_3)_3$, $—CH_2CH_2CH_2CH(CH_3)_2$, but is not limited thereto.

When m1 is 1, n1 may be 0 or 1, and the alkenyl group, the C2 to C6 alkenyl group substituted by none of halo group and aldehyde group, the mono-olefin group, or the C2 to C6 mono-olefin group substituted by none of halo group and aldehyde group represented by $R^{31}$ may be $—CH=CH_2$, $—CH_2CH=CH_2$, $—C(CH_3)=CH_2$, but is not limited thereto. When m2 is 1, n2 may be 0 or 1, and the alkenyl group, the C2 to C6 alkenyl group substituted by none of halo group and aldehyde group, the mono-olefin group, or the C2 to C6 mono-olefin group substituted by none of halo group and aldehyde group represented by $R^{32}$ may be $—CH=CH_2$, $—CH_2CH=CH_2$, $—C(CH_3)=CH_2$, or $—CH=CHCH_3$, but is not limited thereto. Preferably, the $—(OR^{21})_{m1}—[OC(=O)R^{31}]_{m1}$ or $—(OR^{22})_{n2}—[OC(=O)R^{32}]_{m2}$ independently represent

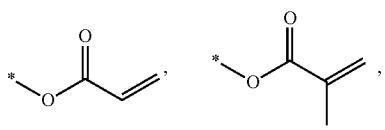

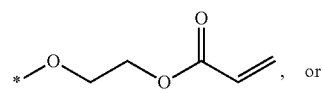, or

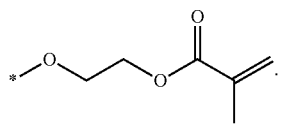.

When Y is —C(=O)—, —P(=O)(R$^{41}$)—, or —P(=S)(R$^{42}$)—, and p is 1, the alkenyl group, the C2 to C6 alkenyl group substituted by none of halo group and aldehyde group, the mono-olefin group, or the C2 to C6 mono-olefin group substituted by none of halo group and aldehyde group may be —CH=CH$_2$, —CH$_2$CH=CH$_2$, or —C(CH$_3$)=CH$_2$, but is not limited thereto. Preferably, the —(Y)$_p$(R$^{33}$)$_{m3}$ is —C(=O)C(CH$_3$)=CH$_2$, —P(=O)(CH$_3$)CH$_2$CH=CH$_2$, or —P(=S)(CH$_3$)CH=CH$_2$.

When Y is —O— or —S—, the alkenyl group, the C2 to C6 alkenyl group substituted by none of halo group and aldehyde group, the mono-olefin group, or the C2 to C6 mono-olefin group substituted by none of halo group and aldehyde group may be —CH=CH$_2$, —CH$_2$CH=CH$_2$, or —C(CH$_3$)=CH$_2$, but is not limited thereto. Preferably, the —(Y)$_p$(R$^{33}$)$_{m3}$ is —OCH$_2$CH=CH$_2$ or —SCH$_2$CH=CH$_2$.

When Y is a phenylene group, the phenylene group may be a para-phenylene group, a meta-phenylene group or an ortho-phenylene group, the alkenyl group, the C2 to C6 alkenyl group substituted by none of halo group and aldehyde group, the mono-olefin group, or the C2 to C6 mono-olefin group substituted by none of halo group and aldehyde group may be —CH=CH$_2$, —CH$_2$CH=CH$_2$, or —C(CH$_3$)=CH$_2$. Preferably, the phenylene group is a meta-phenylene group. Preferably, the —(Y)$_p$(R$^{33}$)$_{m3}$ is

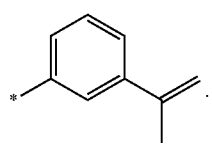 [SMILES: *c1cccc(C(=C)C)c1].

In the disclosure, the term "C1 to C10" refers to that a substituting group may have a carbon number of any integer in the range of 1 to 10, such as 2, 3, 4, 5, 6, 7, 8, 9, or in any range or subrange therebetween. Similarly, the term "C2 to C6" refers to that a substituting group may have a carbon number of any integer in the range of 2 to 6, such as 3, 4, 5, or in any range or subrange therebetween; and the term "C3 to C6" refers to that a substituting group may have a carbon number of any integer in the range of 3 to 6, such as 4, 5, or in any range or subrange therebetween, and so on.

In the modified polyvinyl alcohol-based polymer of the present disclosure, the examples of the modifying monomer unit are listed below:

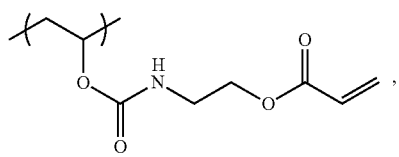

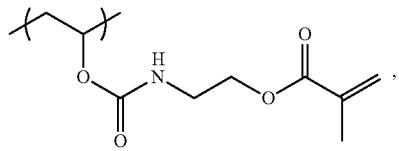

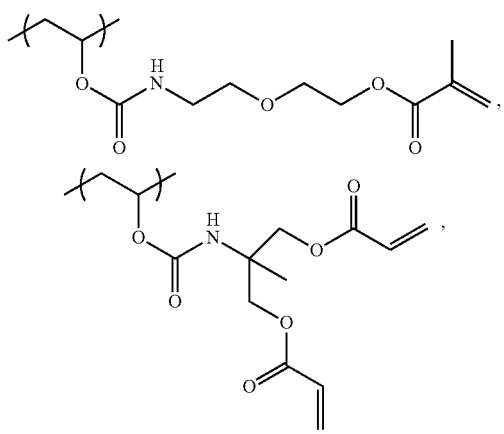

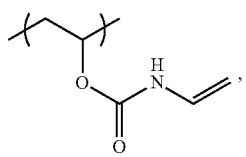 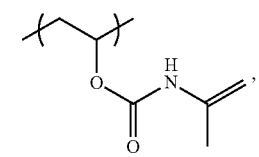

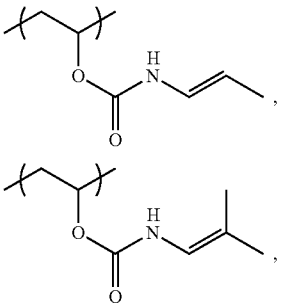

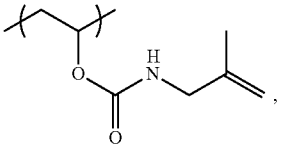

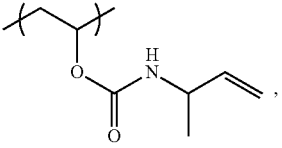

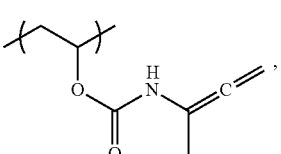

-continued
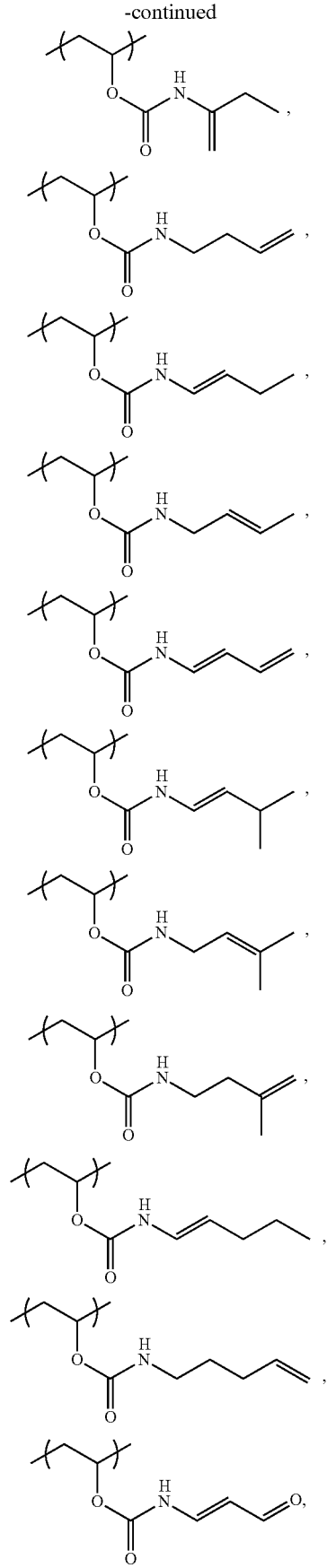
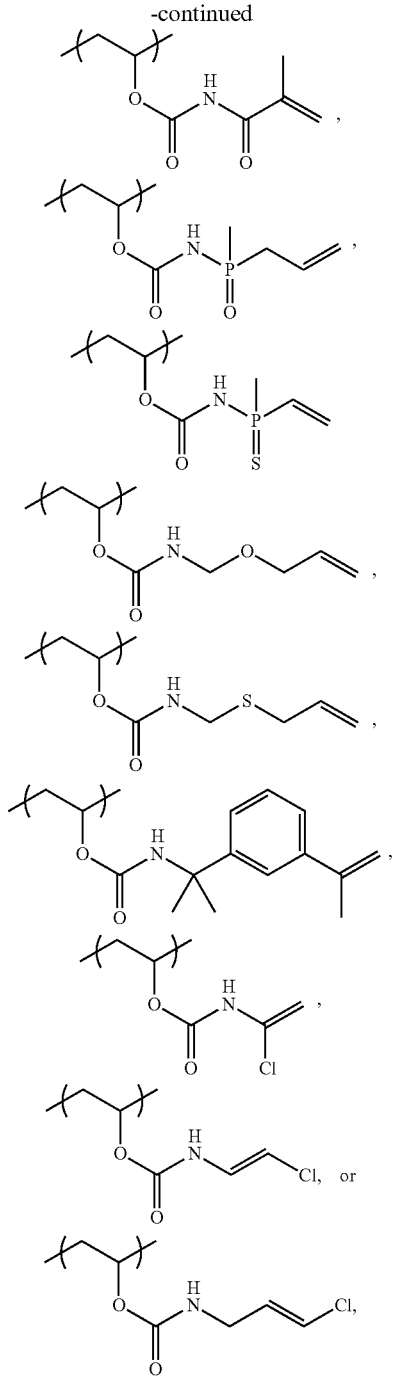
but are not limited thereto.
Besides the above-mentioned modifying monomer unit, the modified polyvinyl alcohol-based polymer of the present disclosure further comprises a first monomer unit represented by Formula (II), a second monomer unit represented by Formula (III) and a third monomer unit represented by Formula (IV):
Formula (II)
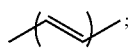

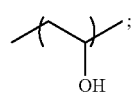

Formula (III)

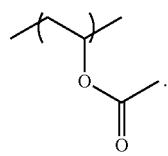

Formula (IV)

According to the present disclosure, in UV absorption spectroscopy of an aqueous solution comprising 0.1 percent by weight of the modified polyvinyl alcohol-based polymer, the absorbance at 215 nanometer (nm) wavelength ranges from 0.34 to 0.8. In one embodiment, the absorbance at 215 nm wavelength ranges from 0.340 to 0.790.

According to the present disclosure, in UV absorption spectroscopy of an aqueous solution comprising 0.1 percent by weight of the modified polyvinyl alcohol-based polymer, the absorbance at 280 nm wavelength ranges from 0.3 to 0.4. In one embodiment, the absorbance at 280 nm wavelength ranges from 0.310 to 0.398.

According to the present disclosure, in UV absorption spectroscopy of an aqueous solution comprising 0.1 percent by weight of the modified polyvinyl alcohol-based polymer, the absorbance at 320 nm wavelength ranges from 0.06 to 0.09. In one embodiment, the absorbance at 320 nm wavelength ranges from 0.060 to 0.088.

According to the present disclosure, the modified polyvinyl alcohol-based polymer may have a yellow index (YI) ranging from 10 to 35. In one embodiment, the modified polyvinyl alcohol-based polymer may have a YI ranging from 10 to 32. In another embodiment, the modified polyvinyl alcohol-based polymer may have a YI ranging from 10 to 30.

According to the present disclosure, the modified polyvinyl alcohol-based polymer has viscosity ranging from 5.0 centipoise/second (cps) to 6.55 cps. In one embodiment, the modified polyvinyl alcohol-based polymer has viscosity ranging from 5.3 cps to 6.5 cps. In one embodiment, the modified polyvinyl alcohol-based polymer has viscosity ranging from 5.3 cps to 6.2 cps.

To achieve the above purpose, the present disclosure also provides an application of the modified polyvinyl alcohol-based polymer, comprising mixing a vinyl chloride monomer with the above-mentioned modified polyvinyl alcohol-based polymer to conduct suspension polymerization.

The modified polyvinyl alcohol-based polymer of the present disclosure is suitable to be used as a dispersant for suspension polymerization to provide great dispersion stability in suspension polymerization reaction, so the obtained polyvinyl chloride-based resin has reduced particle diameter and few coarse particles.

In one embodiment, based on the amount of the vinyl chloride monomer, the modified polyvinyl alcohol-based polymer may have an amount of 500 ppm to 1200 ppm. In another embodiment, based on the amount of the vinyl chloride monomer, the modified polyvinyl alcohol-based polymer may have an amount of 600 ppm to 1000 ppm.

In one embodiment, the modified polyvinyl alcohol-based polymer can be used alone as the dispersant to stabilize suspension polymerization reaction. In another embodiment, the modified polyvinyl alcohol-based polymer can be used with any other conventional dispersant to form a dispersant combination; and the conventional dispersant may be, such as, polyvinyl alcohol, gelatin, cellulose ether, but is not limited thereto. In this embodiment, based on the amount of the vinyl chloride monomer, the amount of the dispersant combination (i.e., the sum of the amount the modified polyvinyl alcohol-based polymer and the amount of the any other conventional dispersant) may be 600 ppm to 1500 ppm.

According to the present disclosure, the vinyl chloride monomer and the modified polyvinyl alcohol-based polymer can be mixed with an initiator in water to conduct suspension polymerization. The initiator may be, such as, di(2-ethylhexyl) peroxydicarbonate (EHP), cumyl peroxyneodecanoate (CNP), tert-butyl peroxyneo-caprate (BNP), 3,5,5-trimethylhexanoyl peroxide (TMHP), 2,2'-azobis-isobutyronitrile (AIBN), 2,2'-azobis(2,4-dimethylvaleronitrile (ADVN), but is not limited thereto. In one embodiment, based on the amount of the vinyl chloride monomer, the initiator may have an amount of 600 ppm to 1500 ppm.

DETAILED DESCRIPTION OF THE PREFERRED EMBODIMENTS

Several Examples are used to demonstrate the modified polyvinyl alcohol-based polymer and its application in suspension polymerization, and several Comparative Examples are provided for comparison. A person having ordinary skill in the art can readily understand the advantages and effects of the present disclosure by the following Examples and Comparative Examples. It should be understood that the Examples exemplified in the description are merely used to demonstrate the practice of the present disclosure, not used to limit the scope of the present disclosure. A person having ordinary skill in the art can make modifications or changes according to common knowledge without departing the spirit of the present disclosure to practice or apply the present disclosure.

Modifier

The CAS Nos. and structural formulae of the modifiers which can be chosen for producing the modified polyvinyl alcohol-based polymers are listed in the following Table 1, but are not limited thereto. Based on the chosen modifier, modifying monomer units of the modified polyvinyl alcohol-based polymers are also respectively shown in the following Table 1.

TABLE 1

Cas Nos. and structural formulae of modifiers, and structural formulae of modifying monomer units.

| CAS No. of modifier | Structural formula of modifier | Structural formula of modifying monomer unit |
| --- | --- | --- |
| 13641-96-8 | | |
| 30674-80-7 | | |
| 107023-60-9 | | |
| 886577-76-0 | | |
| 3555-94-0 | | |
| 4747-87-9 | | |
| 4737-18-2 | | |
| 1476-23-9 | | |

TABLE 1-continued

CAS Nos. and structural formulae of modifiers, and structural formulae of modifying monomer units.

| CAS No. of modifier | Structural formula of modifier | Structural formula of modifying monomer unit |
|---|---|---|
| 28705-49-9 | | |
| 10182-00-0 | | |
| 155469-99-1 | | |
| 141462-09-1 | | |
| 4747-78-8 | | |
| 52114-85-9 | | |
| 40352-23-6 | | |
| 26653-31-6 | | |
| 44610-34-6 | | |

TABLE 1-continued

CAS Nos. and structural formulae of modifiers, and structural formulae of modifying monomer units.

| CAS No. of modifier | Structural formula of modifier | Structural formula of modifying monomer unit |
|---|---|---|
| 69668-36-6 | | |
| 1611-61-6 | | |
| 117555-84-7 | | |
| 88310-63-8 | | |
| 2487-98-1 | | |
| 74616-97-0 | | |
| 4474-60-6 | | |
| 113419-13-9 | | |
| 113419-11-7 | | |

TABLE 1-continued

CAS Nos. and structural formulae of modifiers, and structural formulae of modifying monomer units.

| CAS No. of modifier | Structural formula of modifier | Structural formula of modifying monomer unit |
|---|---|---|
| 6427-22-1 | | |
| 39243-45-3 | | |
| 2094-99-7 | | |
| 32772-94-4 | | |
| 26817-10-7 | | |
| 56620-44-1 | | |

Besides the modifiers listed in the above Table 1, the skilled artisan also can choose any other ingredient having an isocyanate group and at least one alkenyl group as the modifier, and conduct the modification of polyvinyl alcohol by the method described hereinafter to obtain the modified polyvinyl alcohol-based polymer.

Control: Polyvinyl Alcohol-Based Polymer

Non-modified polyvinyl alcohol-based polymer is used as Control, which has a structure represented by Formula (I'). The non-modified polyvinyl alcohol-based polymer has a polymerization degree of 700, a saponification degree of about 72.36 mol %, viscosity of about 5.99 cps, YI of about 35.95.

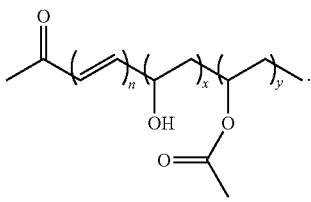

Formula (I')

MODIFIED POLYVINYL ALCOHOL-BASED POLYMER

Examples 1 to 3

For Examples 1 to 3, the polyvinyl alcohol-based polymer (Control) was modified by the following steps a to c, to obtain modified polyvinyl alcohol-based polymers:

a. adding a particular amount of a modifier (as shown in the following Table 2) into 400 parts by weight of methanol (MeOH, as a swelling agent) to obtain a modifying solution;
b. adding the modifying solution into 100 parts by weight of polyvinyl alcohol-based polymer having a polymerization degree of about 700 and a saponification degree of about 72.36 mol % to react at 60° C. for 6 hours, to obtain a modified product;
c. washing the modified product with methanol for multiple times, centrifuging to remove liquid, and drying at 105° C. for 2 hours, to obtain the modified polyvinyl alcohol-based polymer.

Examples 4 to 6 and Comparative Example 1

For Examples 4 to 6 and Comparative Example 1, the polyvinyl alcohol-based polymer (Control) was modified by the following steps a to c, to obtain modified polyvinyl alcohol-based polymers:
a. adding a particular part by weight of modifier (as shown in the following Table 2) into 43 parts by weight of methyl acetate (MeAc, as a swelling agent) to obtain a modifying solution;
b. adding the modifying solution into 100 parts by weight of polyvinyl alcohol-based polymer having a polymerization degree of about 700 and a saponification degree of about 72.36 mol % to react at 60° C. for 6 hours, to obtain a modified product;
c. washing the modified product with methyl acetate for multiple times, centrifuging to remove liquid, and drying at 105° C. for 2 hours, to obtain the modified polyvinyl alcohol-based polymer.

Example 7

For Example 7, the polyvinyl alcohol-based polymer was modified by the following steps a to c, to obtain a modified polyvinyl alcohol-based polymer:
a. adding a particular part by weight of modifier (as shown in the following Table 2) into 43 parts by weight of methyl acetate (as a swelling agent) to obtain a modifying solution;
b. adding the modifying solution into 100 parts by weight of polyvinyl alcohol-based polymer having a polymerization degree of about 700 and a saponification degree of about 73.11 mol % to react at 60° C. for 6 hours, to obtain a modified product;
c. washing the modified product with methyl acetate for multiple times, centrifuging to remove liquid, and drying at 105° C. for 2 hours, to obtain the modified polyvinyl alcohol-based polymer.

Comparative Example 2

For Comparative Example 2, the polyvinyl alcohol-based polymer was modified by the following steps a to c, to obtain modified polyvinyl alcohol-based polymers:
a. adding a particular part by weight of modifier (as shown in the following Table 2) into 43 parts by weight of methyl acetate (as a swelling agent) to obtain a modifying solution;
b. adding the modifying solution into 100 parts by weight of polyvinyl alcohol-based polymer having a polymerization degree of about 700 and a saponification degree of about 86.97 mol % to react at 60° C. for 6 hours, to obtain a modified product;
c. washing the modified product with methyl acetate for multiple times, centrifuging to remove liquid, and drying at 105° C. for 2 hours, to obtain the modified polyvinyl alcohol-based polymer.

TABLE 2

CAS Nos. and amount of modifiers used for Examples 1 to 7 and Comparative Examples 1 and 2, and analysis results of the modified polyvinyl alcohol-based polymers of Examples 1 to 7, Comparative Examples 1 and 2, and the polyvinyl alcohol-based polymer of Control.

| | Modifier | | Modified polyvinyl alcohol-based polymer | | | |
|---|---|---|---|---|---|---|
| | CAS No. | Amount (part by weight) | Modification rate (mol %) | Saponification degree (mol %) | Viscosity (cps) | YI |
| Example 1 | 886577-76-0 | 5 | 0.34 | 72.54 | 6.04 | 12.86 |
| Example 2 | 13641-96-8 | 9 | 1.24 | 72.10 | 6.12 | 22.15 |
| Example 3 | 13641-96-8 | 12 | 1.26 | 72.33 | 6.01 | 14.00 |
| Example 4 | 886577-76-0 | 0.04 | 0.04 | 71.90 | 5.55 | 24.78 |
| Example 5 | 13641-96-8 | 0.39 | 0.21 | 72.06 | 5.45 | 19.97 |
| Example 6 | 13641-96-8 | 0.52 | 0.29 | 72.12 | 5.51 | 22.11 |
| Example 7 | 107023-60-9 | 1.34 | 0.14 | 73.33 | 6.51 | 27.09 |
| Comparative Example 1 | 13641-96-8 | 11.61 | 2.03 | 71.93 | not soluble | 34.23 |
| Comparative Example 2 | 13641-96-8 | 0.39 | 0.17 | 86.65 | 5.73 | 24.70 |
| Control | N/A | N/A | N/A | 72.36 | 5.99 | 35.95 |

Testing Example 1: Characteristic Analysis

The methods for analyzing saponification degree, viscosity and yellow index used for the modified polyvinyl alcohol-based polymers of Examples 1 to 7 and Comparative Examples 1 and 2, and the non-modified polyvinyl alcohol of Control are listed below, and the results are described earlier and listed in the above Table 2.
Saponification degree: measured according to the standard method JIS K 6726(1994);
Viscosity: measured according to standard method JIS K 6726(1994); and
YI: measured according to standard method ASTM E313-98.
As shown in the above Table 2, the modified polyvinyl alcohol-based polymers of Examples 1 to 7 have a saponification degree of about 67 mol % to 78 mol %. In addition, the modified polyvinyl alcohol-based polymers of Examples 1 to 7 have viscosity of about 5.0 cps to 6.55 cps, and YI of about 10 to 35.

Testing Example 2: Modification Rate

The modified polyvinyl alcohol-based polymers of Examples 1 to 7 and Comparative Examples 1 and 2 were used as objects to be analyzed in this testing example. Each object to be analyzed was dissolved in hexadeuterodimethyl sulfoxide (DMSO-d6, item number: DLM-10-10, purchased from Cambridge Isotope Laboratories, Inc.) and prepared as a testing sample, and then analyzed at 25° C. by hydrogen-1 NMR spectroscopy ($^1$H-NMR, Avance II 400 MHz, from Bruker) at 400 MHz and carbon-13 NMR spectroscopy ($^{13}$C-NMR, Varian VNMRS-600 NMR Spectrometer, from Varian) at 600 MHz.
In $^1$H-NMR analysis results of the testing samples, the hydrogen signals corresponding to those on the alkenyl group comprised in X of the modifying monomer unit could be observed at a chemical shift position between 5.8 ppm and 6.5 ppm, and the integral value of the first characteristic peak was obtained accordingly; the hydrogen signal corresponding to that on the methyne group of the main chain connecting with a hydroxyl group could be observed at a chemical shift position between 3.5 ppm and 3.9 ppm, and the integral value of the second characteristic peak was obtained accordingly; the hydrogen signals corresponding to those on the acetoxy group of the side chain could be observed at a chemical shift position between 1.9 ppm and 2.0 ppm, and the integral value of the third characteristic peak was obtained accordingly. The modification rate of each modified polyvinyl alcohol-based polymer in mol % could be obtained by the ratio of integral value of the first characteristic peak to the sum of integral values of the first, second and third characteristic peaks. The results are shown in the above Table 2.

The examples in which CAS No. 13641-96-8 are used to modify a polyvinyl alcohol-based polymer are exemplified hereinafter, and the modified polyvinyl alcohol-based polymers (such as those of Examples 2, 3, 5 and 6) have a structure represented by Formula (I″). Additionally, in the $^1$H-NMR analysis results of these modified polyvinyl alcohol-based polymers, the hydrogen signals corresponding to those on the alkenyl group (marked at the position 1 in the following Formula (I″)) comprised in X of the modifying monomer unit could be observed at a chemical shift position between 5.8 ppm and 6.5 ppm, and the integral value of the first characteristic peak was obtained accordingly; the hydrogen signal corresponding to that on the methyne group of the main chain (marked at the position 2 in the following Formula (I″)) connecting with a hydroxyl group could be observed at a chemical shift position between 3.5 ppm and 3.9 ppm, and the integral value of the second characteristic peak was obtained accordingly; the hydrogen signals corresponding to those on the acetoxy group of the side chain (marked at the position 3 in the following Formula (I″)) could be observed at a chemical shift position between 1.9 ppm and 2.0 ppm, and the integral value of the third characteristic peak was obtained accordingly.

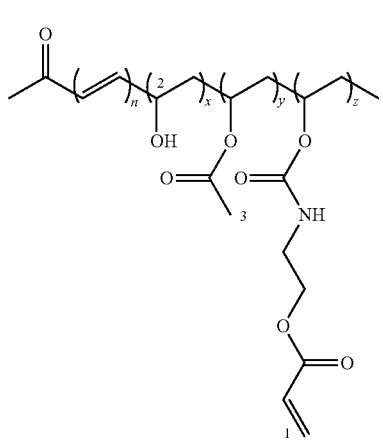

Formula (I″)

Additionally, in the $^{13}$C-NMR analysis results of each testing sample, carbonyl group signals corresponding to the urethane group (marked at the positions b in the following Formula (I‴)) comprised in the modifying monomer unit could be observed at a chemical shift position between 160 ppm and 170 ppm; and signals corresponding to methyne group (marked at the position a in the following Formula (I‴)) on the main chain could be observed at a chemical shift position between 60 ppm and 80 ppm. It is confirmed that the modified polyvinyl alcohol-based polymers have a modifying monomer unit structure comprising a urethane group.

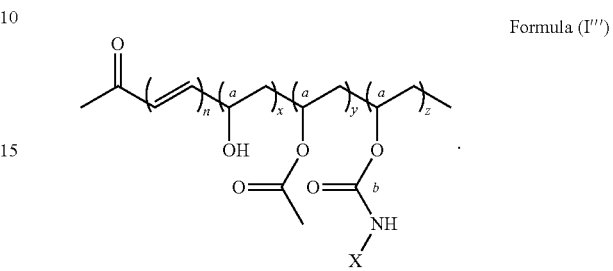

Formula (I‴)

As shown in the above Table 2, the modification rate of Examples 1 to 7 is controlled between 0.02 mol % and 1.5 mol %. On the contrary, the modification rate of Comparative Example 1 is up to 2 mol % or more.

Testing Example 3: Absorbance

The modified polyvinyl alcohol-based polymers of Examples 1 to 7 and Comparative Examples 1 and 2, and the polyvinyl alcohol-based polymer of Control were used as objects to be analyzed in this testing example. Each object to be analyzed was prepared into a 0.1 wt% aqueous solution as a testing sample. Each testing sample was poured into a cuvette with a path length of 1 centimeter, and analyzed with a UV/Vis/NIR spectrometry (V-730, from JASCO), to obtain the absorbance values of each testing sample at wavelengths of 215 nm, 280 nm and 320 nm in UV absorption spectroscopy. The results are shown in the following Table 3.

The absorbance at 215 nm wavelength in UV absorption spectroscopy represents —C(=O) CH=CH— on the main-chain structure in the modified polyvinyl alcohol-based polymer; the absorbance at 280 nm wavelength in UV absorption spectroscopy represents —C(=O)—(CH=CH)$_2$— on the main-chain structure in the modified polyvinyl alcohol-based polymer; and the absorbance at 320 nm wavelength in UV absorption spectroscopy represents —C(=O)—(CH=CH)$_3$— on the main-chain structure in the modified polyvinyl alcohol-based polymer. The higher absorbance at a particular wavelength represents the more corresponding structure in the testing sample.

It should be noted that, the modified polyvinyl alcohol-based polymer of Comparative Example 1 could not be homogenously dissolved in water and prepared into a 0.1 wt % aqueous solution. Thus, it is shown as "-" in the following Table 3.

TABLE 3

Absorbance values of 0.1 wt % aqueous solution prepared by Examples 1 to 7, Comparative Examples 1 and 2 and Control at different wavelengths.

|  | Absorbance at 215 nm | Absorbance at 280 nm | Absorbance at 320 nm |
| --- | --- | --- | --- |
| Example 1 | 0.608 | 0.364 | 0.075 |
| Example 2 | 0.600 | 0.321 | 0.062 |

TABLE 3-continued

Absorbance values of 0.1 wt % aqueous solution prepared by Examples 1 to 7, Comparative Examples 1 and 2 and Control at different wavelengths.

|  | Absorbance at 215 nm | Absorbance at 280 nm | Absorbance at 320 nm |
|---|---|---|---|
| Example 3 | 0.785 | 0.314 | 0.071 |
| Example 4 | 0.348 | 0.389 | 0.081 |
| Example 5 | 0.394 | 0.380 | 0.080 |
| Example 6 | 0.423 | 0.397 | 0.086 |
| Example 7 | 0.551 | 0.361 | 0.087 |
| Control | 0.323 | 0.400 | 0.080 |
| Comparative Example 1 | — | — | — |
| Comparative Example 2 | 0.354 | 0.383 | 0.076 |

As shown in the above Table 3, the 0.1 wt % aqueous solutions of the modified polyvinyl alcohol-based polymers of Examples 1 to 7 have absorbance at 215 nm wavelength of 0.34 to 0.8, absorbance at 280 nm wavelength of 0.3 to 0.4, and absorbance at 320 nm wavelength of 0.06 to 0.09.

Application of Modified Polyvinyl Alcohol-Based Polymer

The modified polyvinyl alcohol-based polymer can be used as a dispersant for suspension polymerization, particularly as a dispersant which can be applied to PVC suspension polymerization. Hereinafter, the application of the modified polyvinyl alcohol-based polymer as a dispersant for PVC suspension polymerization is demonstrated.

Examples 1A to 7A, and Comparative Examples 1A and 2A

In Examples 1A to 7A and Comparative Examples 1A and 2A, the modified polyvinyl alcohol-based polymers of Examples 1 to 7 and Comparative Examples 1 and 2 were used respectively as a dispersant, and the polyvinyl chloride-based resins were obtained by the method described below.

First, 2.9 kilograms (kg) of vinyl chloride monomer, 2.9 grams (g) of the dispersant combination (1000 ppm) and 5.3 kg of water were added into a reactor to form a mix solution. In the dispersant combination, based on the amount of the vinyl chloride monomer, the amount of the modified polyvinyl alcohol-based polymer was 800 ppm, the amount of the partially saponified polyvinyl alcohol (polymerization degree: 200; saponification degree: 55 mol %) was 100 ppm, and the amount of hydroxypropyl methylcellulose was 100 ppm.

Then, 2.9 g of di(2-ethylhexyl) peroxydicarbonate (1000 ppm) was added into the mix solution, and heated to 64° C. to conduct suspension polymerization reaction to obtain a polyvinyl chloride slurry.

At last, the pressure of the reactor was lowered to 0.1 MPa, and then the polyvinyl chloride slurry was centrifuged to remove liquid and dried at 60° C. in an oven to obtain PVC resin.

Control A

In Control A, a PVC resin was prepared by the above-mentioned method except the polyvinyl alcohol-based polymer of Control was used to substitute the modified polyvinyl alcohol-based polymers used in the Examples 1A to 7A and Comparative Examples 1A and 2A.

Testing Example 4: Stability of Suspension Polymerization

To evaluate the stabilization effect of each of the modified polyvinyl alcohol-based polymers of Examples and Comparative Examples, and the polyvinyl alcohol-based polymer of Control as a dispersant for suspension polymerization, PVC resins obtained from Examples 1A to 6A, Comparative Examples 1A and 2A, and Control 1A were chosen as samples to be tested in this testing example, and the averaged particle diameter and the proportion of particles with a particle diameter of 60 mesh (inclusive) or more of the PVC resins were measured according to standard method ASTM D1921, so as to evaluate the stabilization effect of the modified polyvinyl alcohol-based polymers as a dispersant. The results are shown in the following Table 4.

Herein, it should be noted that, the modified polyvinyl alcohol-based polymer of Comparative Example 1 could not be homogenously dissolved in water to work as a dispersant, so the Comparative Example 1 could not be used for suspension polymerization and the averaged particle diameter and proportion of particles with a particle diameter of 60 mesh or more of the PVC resin of Comparative Example 1A could not be measured. Thus, it is shown as "-" in the following Table 4.

TABLE 4

Characteristics of the modified polyvinyl alcohol-based polymers of Examples 1 to 6 and Comparative Examples 1 and 2, and the polyvinyl alcohol-based polymer of Control, and the particle diameter analysis result of the PVC resins obtained in suspension polymerization for which they apply.

| | Modified polyvinyl alcohol-based polymer | | PVC resin | | |
|---|---|---|---|---|---|
| Sample number | Modification rate (mol %) | Saponification degree (mol %) | Sample number | Averaged particle diameter (μm) | Proportion of particles of 60 mesh or more (%) |
| Example 1 | 0.34 | 72.54 | Example 1A | 121 | 0.13 |
| Example 2 | 1.24 | 72.10 | Example 2A | 134 | 0.27 |
| Example 3 | 1.26 | 72.33 | Example 3A | 124 | 0.89 |
| Example 4 | 0.04 | 71.90 | Example 4A | 126 | 1.50 |
| Example 5 | 0.21 | 72.06 | Example 5A | 127 | 0.66 |
| Example 6 | 0.29 | 72.12 | Example 6A | 118 | 1.93 |
| Comparative Example 1 | 2.03 | 71.93 | Comparative Example 1A | — | — |

TABLE 4-continued

Characteristics of the modified polyvinyl alcohol-based polymers of Examples 1 to 6 and Comparative Examples 1 and 2, and the polyvinyl alcohol-based polymer of Control, and the particle diameter analysis result of the PVC resins obtained in suspension polymerization for which they apply.

| | Modified polyvinyl alcohol-based polymer | | PVC resin | | |
|---|---|---|---|---|---|
| Sample number | Modification rate (mol %) | Saponification degree (mol %) | Sample number | Averaged particle diameter (μm) | Proportion of particles of 60 mesh or more (%) |
| Comparative Example 2 | 0.17 | 86.65 | Comparative Example 2A | 199 | 3.93 |
| Control | 0 | 72.36 | Control A | 169 | 4.05 |

The comparison results from the above Table 4 show that, when the dispersant combinations of the same amount are used to regulate the dispersion stability of suspension polymerization reaction, the averaged particle diameter of PVC resins of Examples 1A to 6A is obviously smaller than that of PVC resins of Comparative Example 2A and Control A; and the proportion of particles of 60 mesh or more in PVC resins of Examples 1A to 6A is also obviously less than that of PVC resins of Comparative Example 2A and Control A. Therefore, it is clear that, when the modified polyvinyl alcohol-based polymer has a modifying monomer unit represented by Formula (I), a modification rate of 0.02 mol % to 1.5 mol %, and a saponification degree of 67 mol % to 78 mol %, this modified polyvinyl alcohol-based polymer is suitable to be used as a dispersant for suspension polymerization; and it is particularly advantageous for promoting the dispersion stability of the suspension polymerization reaction of vinyl chloride monomer, to obtain a PVC resin having reduced particle diameter and few coarse particles.

In the particle diameter analysis results of PVC resins of Examples 1A to 6A and Control A, it is found that the dispersion stability of suspension polymerization reaction of vinyl chloride monomer can be specifically promoted by the modified polyvinyl alcohol-based polymers of Examples 1 to 6, compared to the non-modified polyvinyl alcohol-based polymer (Control). Therefore, compared to the PVC resin of Control A, the PVC resins of Examples 1A to 6A have reduced particle diameter and few coarse particles.

Further, in the comparison of Examples 1A to 6A with Comparative Examples 1A and 2A, it is found that Comparative Examples 1 and 2 are modified polyvinyl alcohol-based polymers without approximately controlled modification rate and saponification degree, so they cannot stabilize suspension polymerization reaction as expected. Specifically, the modified polyvinyl alcohol-based polymer of Comparative Example 2 has a saponification degree of more than 78 mol %, so the PVC resin of Comparative Example 2A has a particle diameter not as small as expected, and a number of coarse particles not as few as expected. However, the modified polyvinyl alcohol-based polymer of Comparative Example 1 has a modification rate of more than 1.5 mol %, so the PVC resin of Comparative Example 1A cannot even be subjected to particle diameter analysis.

In summary, the modified polyvinyl alcohol-based polymer of the present disclosure has a modifying monomer unit represented by Formula (I), a saponification degree of 67 mol % to 78 mol % and a modification rate of 0.02 mol % to 1.5 mol %; and the modified polyvinyl alcohol-based polymer is suitable to be used as a dispersant for suspension polymerization, which provides great dispersion stability in suspension polymerization reaction, and makes the produced PVC-based resin have advantages of reduced particle diameter and few coarse particles.

The invention claimed is:

1. A modified polyvinyl alcohol-based polymer, wherein the modified polyvinyl alcohol-based polymer comprises a modifying monomer unit represented by Formula (I):

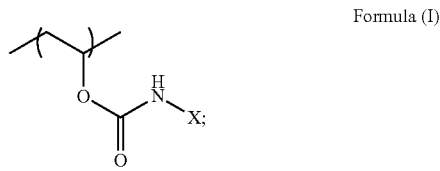

Formula (I)

in Formula (I), X is a moiety comprising an alkenyl group;
wherein, the modified polyvinyl alcohol-based polymer has a saponification degree of 67 percent by mole to 78 percent by mole and a modification rate of 0.02 percent by mole to 1.5 percent by mole.

2. The modified polyvinyl alcohol-based polymer as claimed in claim 1, wherein the modifying monomer unit has a structure represented by Formula (I-I):

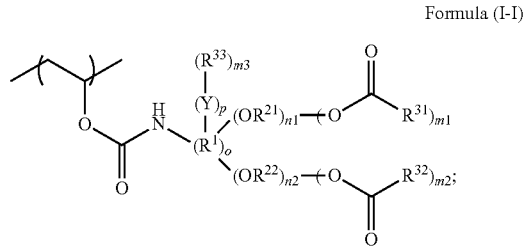

Formula (I-I)

in Formula (I-I), Y is —C(=O)—, —P(=O)($R^{41}$)—, —P(=S)($R^{42}$)—, —O—, —S—, or a phenylene group;
in Formula (I-I), $R^1$ is a C1 to C10 alkylene group; $R^{21}$ and $R^{22}$ each independently represent a C1 to C10 alkylene group; $R^{31}$, $R^{32}$ and $R^{33}$ each independently represent a C2 to C6 alkenyl group substituted by none of halo group and aldehyde group, a C2 to C6 alkenyl group substituted by a halo group, or a C2 to C6 alkenyl group substituted by an aldehyde group; $R^{41}$ and $R^{42}$ each independently represent a C1 to C6 alkyl group;

in Formula (I-I), o, p, n1, n2, m1, m2 and m3 each independently represent 0 or 1; the sum of m1, m2 and m3 is 1 to 3; n1 is not larger than m1; n2 is not larger than m2; p is not larger than m3.

3. The modified polyvinyl alcohol-based polymer as claimed in claim 1, wherein the modifying monomer unit has a structure represented by Formula (I-II):

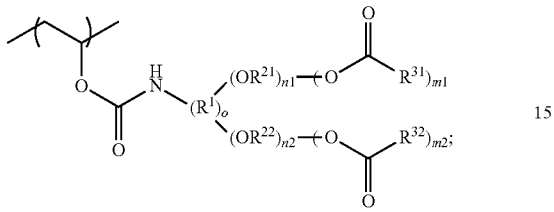

Formula (I-II)

in Formula (I-II), $R^1$ is a C1 to C6 alkylene group; $R^{21}$ and $R^{22}$ each independently represent a C1 to C6 alkylene group; $R^{31}$ and $R^{32}$ each independently represent a C2 to C6 mono-olefin group substituted by none of halo group and aldehyde group;

in Formula (I-II), o and m1 are 1; n1, n2 and m2 each independently represent 0 or 1; and n2 is not larger than m2.

4. The modified polyvinyl alcohol-based polymer as claimed in claim 1, wherein the modifying monomer unit has a structure represented by Formula (I-III):

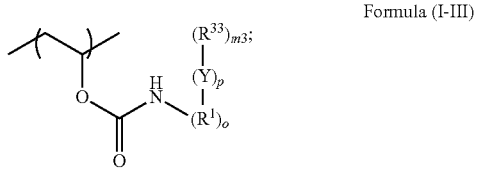

Formula (I-III)

in Formula (I-III), $R^1$ is a C1 to C6 alkylene group; Y is —C(=O)—, —P(=O)($R^{41}$)—, —P(=S)($R^{42}$)—, —O—, —S—, or a phenylene group; $R^{33}$ is a C2 to C6 mono-olefin group substituted by none of halo group and aldehyde group, a C2 to C6 mono-olefin group substituted by a halo group, a C2 to C6 mono-olefin group substituted by an aldehyde group, a C3 to C6 dienyl group substituted by none of halo group and aldehyde group, a C3 to C6 dienyl group substituted by a halo group, a C3 to C6 dienyl group substituted by an aldehyde group, a C4 to C6 trienyl group substituted by none of halo group and aldehyde group, a C4 to C6 trienyl group substituted by a halo group, or a C4 to C6 trienyl group substituted by an aldehyde group;

in Formula (I-III), o and p each independently represent 0 or 1; m3 is 1.

5. The modified polyvinyl alcohol-based polymer as claimed in claim 1, wherein the modified polyvinyl alcohol-based polymer has a modification rate of 0.02 percent by mole to 1.26 percent by mole.

6. The modified polyvinyl alcohol-based polymer as claimed in claim 1, wherein the modified polyvinyl alcohol-based polymer comprises a first monomer unit represented by Formula (II), a second monomer unit represented by Formula (III) and a third monomer unit represented by Formula (IV):

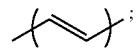

Formula (II)

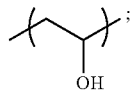

Formula (III)

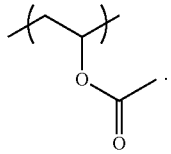

Formula (IV)

7. The modified polyvinyl alcohol-based polymer as claimed in claim 1, wherein an aqueous solution comprising 0.1 percent by weight of the modified polyvinyl alcohol-based polymer has absorbance at 215 nm wavelength ranging from 0.34 to 0.8 in UV absorption spectroscopy.

8. The modified polyvinyl alcohol-based polymer as claimed in claim 1, wherein an aqueous solution comprising 0.1 percent by weight of the modified polyvinyl alcohol-based polymer has absorbance at 280 nm wavelength ranging from 0.3 to 0.4 in UV absorption spectroscopy.

9. The modified polyvinyl alcohol-based polymer as claimed in claim 1, wherein an aqueous solution comprising 0.1 percent by weight of the modified polyvinyl alcohol-based polymer has absorbance at 320 nm wavelength ranging from 0.06 to 0.09 in UV absorption spectroscopy.

10. The modified polyvinyl alcohol-based polymer as claimed in claim 1, wherein the modified polyvinyl alcohol-based polymer has a yellow index of 10 to 35.

11. The modified polyvinyl alcohol-based polymer as claimed in claim 1, wherein the modified polyvinyl alcohol-based polymer has viscosity of 5.0 cps to 6.55 cps.

12. An application of a modified polyvinyl alcohol-based polymer, comprising mixing a vinyl chloride monomer and the modified polyvinyl alcohol-based polymer as claimed in claim 1 for suspension polymerization.

13. The application of claim 12, wherein, based on the amount of the vinyl chloride monomer, the modified polyvinyl alcohol-based polymer has an amount of 500 ppm to 1200 ppm.

* * * * *